US012036182B2

(12) United States Patent
Viens et al.

(10) Patent No.: US 12,036,182 B2
(45) Date of Patent: Jul. 16, 2024

(54) SECURE RECONSTRUCTION DEVICE

(71) Applicant: DUOJECT MEDICAL SYSTEMS INC., Bromont (CA)

(72) Inventors: Mathieu Viens, Granby (CA); Simon Hamel, Knowlton (CA); Sylvain Cloutier, Magog (CA)

(73) Assignee: DUOJECT MEDICAL SYSTEMS INC., Bromont (CA)

( * ) Notice: Subject to any disclaimer, the term of this patent is extended or adjusted under 35 U.S.C. 154(b) by 0 days.

(21) Appl. No.: 18/254,741

(22) PCT Filed: Dec. 21, 2021

(86) PCT No.: PCT/CA2021/000106

§ 371 (c)(1),
(2) Date: May 26, 2023

(87) PCT Pub. No.: WO2022/133573

PCT Pub. Date: Jun. 30, 2022

(65) Prior Publication Data

US 2023/0390158 A1 Dec. 7, 2023

(30) Foreign Application Priority Data

Dec. 22, 2020 (CA) ..................................... 3103497

(51) Int. Cl.
*A61J 1/20* (2006.01)

(52) U.S. Cl.
CPC ........... *A61J 1/2055* (2015.05); *A61J 1/2096* (2013.01)

(58) Field of Classification Search
CPC ...... A61J 1/2089; A61J 1/2013; A61J 1/2006; A61J 1/2055
See application file for complete search history.

(56) References Cited

U.S. PATENT DOCUMENTS

2011/0106045 A1 5/2011 Reynolds et al.
2014/0311624 A1 10/2014 Eilertsen et al.
(Continued)

FOREIGN PATENT DOCUMENTS

WO 2007019091 A2 2/2007
WO 2012125132 A1 9/2012
(Continued)

OTHER PUBLICATIONS

International Search Report for International Application No. PCT/CA2021/000106, dated Mar. 24, 2022.

*Primary Examiner* — Leslie R Deak
(74) *Attorney, Agent, or Firm* — MEDLER FERRO WOODHOUSE & MILLS PLLC

(57) ABSTRACT

A reconstitution device comprising a cartridge (212) containing a first substance, the cartridge having a plunger (238) at one end and a piercable septum (222) at a second end, a vial (218) containing a second substance, the vial having a piercable septum (224), a housing (210), a cartridge needle hub (226), the cartridge needle hub (226) having a needle (228) protruding therefrom, a vial needle hub (229), the vial needle hub having a needle (222) protruding therefrom, the vial needle hub (229) and the cartridge needle hub (226) being releasably securable together, cartridge latches (240) holding the cartridge needle hub (226) within the housing, vial needle hub latches (231) extending to engage the housing, and a plunger rod (232), the plunger rod having an inner portion (234) engageable with the plunger (238) of the cartridge, the plunger rod (232) having an outer portion (236) which is adapted to engage the vial needle hub latches (240) to release the vial needle hub (229) from engagement with the cartridge needle hub (226), whereby the vial (218) and the vial needle hub (229) may be released from the housing.

3 Claims, 12 Drawing Sheets

(56) References Cited

U.S. PATENT DOCUMENTS

| | | | |
|---|---|---|---|
| 2014/0360623 | A1 | 12/2014 | Nielsen et al. |
| 2016/0015900 | A1 | 1/2016 | Cronenberg et al. |
| 2016/0175540 | A1 | 6/2016 | Johnson et al. |

FOREIGN PATENT DOCUMENTS

| | | | |
|---|---|---|---|
| WO | 2015134777 | A1 | 9/2015 |
| WO | 2016028814 | A2 | 2/2016 |
| WO | 2020097715 | A1 | 5/2020 |
| WO | 2020196848 | A1 | 10/2020 |

SECURE RECONSTRUCTION DEVICE

FIELD OF THE INVENTION

The present invention relates to medical devices for delivering compounds such as medical drugs.

BACKGROUND OF THE INVENTION

It is an object of the present invention to provide a fluid transfer assembly for pharmaceutical delivery systems wherein access to the individual components is minimized.

It is a further object of the present invention to provide a method for the preparation of a pharmaceutical composition comprised of two or more separate components which are stored separately.

SUMMARY OF THE INVENTION

According to one embodiment of the present invention, there is provided a transfer system comprising a vial socket, a housing having first and second open ends, the first open end being releasably connected to the vial socket, a needle hub mounted within the housing, a needle having first and second piercing ends mounted in the needle hub, a vial having a neck and a body, the vial being inserted in the vial socket, the vial being non removably retained in the releasably connected vial socket, a cartridge having a plunger sealing an open end thereof, a septum located at an opposite end of the cartridge, and an activation cap for causing the needle to penetrate a septum of the vial and the septum of the cartridge to permit transfer of components therebetween.

According to a further embodiment of the present invention, there is provided a reconstitution device comprising a cartridge containing a first substance, said cartridge having a plunger at one end and a piercable septum at a second end, a vial containing a second substance, said vial having a piercable septum, a housing, a cartridge needle hub, said cartridge needle hub having a needle protruding therefrom, a vial needle hub, said vial needle hub having a needle protruding therefrom, said vial needle hub and said cartridge needle hub being releasably securable together, cartridge latches holding said cartridge needle hub within said housing, vial needle hub latches extending to engage said housing, and a plunger rod, said plunger rod having an inner portion engageable with said plunger of said cartridge, said plunger rod having an outer portion which is adapted to engage said vial needle hub latches to release said vial needle hub from engagement with said cartridge needle hub, whereby said vial and said vial needle hub may be released from said housing.

The vial and the vial socket are preferably provided in an arrangement wherein the vial cannot be removed from the vial socket. This is particularly useful when the components or ingredients in the vial are toxic or in the alternative, when it is important that the contents be accessed for a specific use—i.e. a topical application and not for injection.

Conventional vials may be used—i.e. those having a glass body and a restricted neck area. Preferably, the vial socket will have latches which will engage the neck of the vial to ensure that the vial is securely retained by the vial socket. To this end, the vial socket may utilize an outer housing which surrounds the latches or clasps to prevent access thereto.

The housing of the transfer system is designed to receive a conventional cartridge which will carry the other one of the components to be mixed. Usually, the vial will contain the dry component and the cartridge will contain the liquid component—typically a diluent. However, other arrangements may be utilized including the mixing of two liquids.

The cartridge will have a plunger which seals the open end with a septum located at the opposite end of the cartridge. This is a substantially conventional arrangement known in the art.

A needle hub is provided within the housing and, in the preferred embodiment, comprises two different disengageable members. Each of the members will have a portion of the needle, with each portion of the needle having a piercing end. After activation of the transfer system, one end of the needle hub will be retained by the vial with the other end being mounted on the cartridge and forming a fluid passageway. It is the member which is retained by the cartridge which will form the ultimate dispensing outlet. To this end, the two portions are temporarily secured together and may comprise a tapered dispensing end fitting within the mating component.

While the present invention illustrates a topical application of the mixture, other arrangements may be utilized.

In preferred embodiments of the invention, the vial is preferably retained within the vial socket with a tamper evident arrangement if access to the vial by other means is attempted.

Preferably, the cartridge is also retained within the housing in a non removable manner. In one embodiment, the needle hub is formed of first and second members which are designed to fit together. After mixing of the components, one of the members forming the needle hub may be utilized for dispensing the composition from the cartridge. In topical applications, the dispensing tip would be specifically designed not to accept a needle.

In one particular embodiment, the needle may have an offset arrangement such that access through the needle to the vial is prevented. If desired, a tamper evident seal may be provided between the point of joinder of the vial socket and housing.

Other preferred arrangements will be seen from the accompanying drawings and description thereof.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF THE INVENTION

Figure 1:
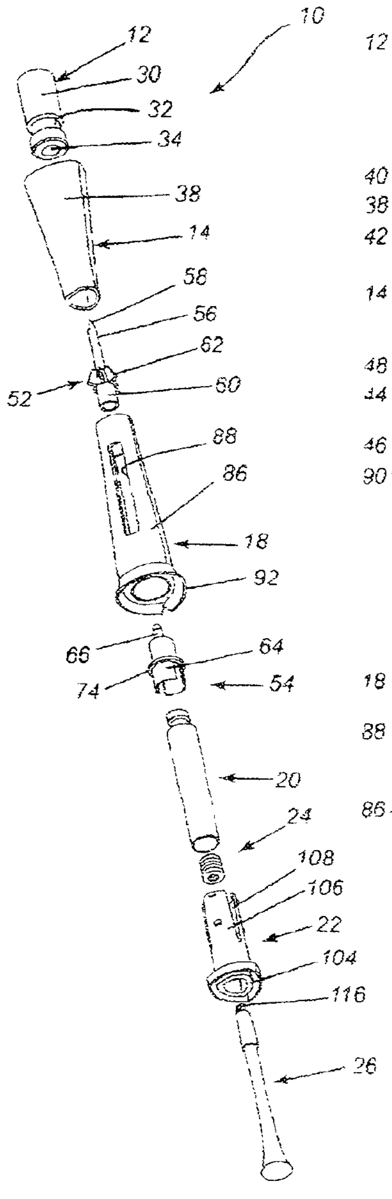
FIG. 1 is an exploded view of a transfer system according to an embodiment of the present invention.

As used in this specification, the singular forms “a”, “an” and “the” specifically also encompass the plural forms of the terms to which they refer, unless the content clearly dictates otherwise. The term “about” is used herein to mean approximately, in the region of roughly, or around. When the term “about” is used in conjunction with a numerical range, it modifies that range by extending the boundaries above and below the numerical values set forth. In general, the term “about” is used herein to modify a numerical value above and below the stated value by a variance of 20%.

Various compounds, such as medical drugs, can be valuable. Thus, their containers may be tampered with (e.g., to steal the drug and/or dilute the contents of the drug) prior to administration to the intended recipient (e.g. a patient in need).

For example, some pain killing drugs (e.g.) an opioid drug such as oxycodone) may be abused or stolen for unauthorized resale.

Other drugs benefit from utilizing security measures.

Based on a condition to be treated and whether it is a medical or cosmetic indication, the dose to be injected varies and accordingly the dilution required and reconstitution volume will change. Leaving the drug and diluent vial supplied individually with an external syringe for traditional way of reconstitution will lead to unwanted errors during the reconstitution process leading to dosing errors and is therefore not advisable. Further, traditional reconstitution process requires multiple steps where open needles have to be handled leading to high risk of needle stick injuries. Traditional process for reconstitution also has the disadvantage of inconsistencies and subjectivity leading to unintended under or over concentration of the dose.

Further when same drug molecule is used for medical and cosmetic indications, there is a high likelihood of potential for misuse due to pricing differences between a prescription vs cosmetic product. This necessitates product differentiation in how the drug product and diluent are presented/packaged.

Conceptually if the drug product vial and sterile diluent vial/cartridge are packaged into a secure system with no access to either the drug product or sterile diluent vial until the drug product is reconstituted with predefined amount of sterile diluent, it will help address the above challenges. One way to achieve this is through product presentation in secure packaging.

A dual chamber syringe was one of the options considered but it can be easily tampered with. For example, the plunger rod can be unscrewed from the diluent chamber and diluent can be drawn out using a regular syringe and needle effortlessly resulting in the amount of diluent the user wants for reconstitution leaving only the amount of diluent the user wants to reconstitute with an intention to misuse or prepare a drug solution of selected concentration rather than following the labelled instructions. Thus dual chamber syringe cannot provide protection from intentional misuse and defeats the objective of providing pre-defined volume of diluent and hence this approach is not desirable.

Therefore efforts were focussed on securing the drug product and diluent vial/cartridge until after reconstitution.

Thus, described herein is a secured reconstitution device that is elegant, stylized and “premium” in its physical appearance. The device described herein is a fully integrated reconstitution system w/o any user assembly required.

In the device described herein, the vial is locked into the holder until unlocked by completion of diluent delivery to drug vial.

The device described herein uses a standard diluent cartridge with a plunger to push diluent into drug vial. Plunger delivery is a proven approach for fluid transfer assurance.

The device described herein features a pre-attached plunger for ease of use.

Moreover, given its general similarities to a basic syringe, use of the device would be intuitive to a user which is a very important requirement for such systems.

Additionally, the device described herein features, in non-limiting embodiments, penetrating one stopper at a time with appropriate gauge needle to reduce overall force.

The design of the device described herein reduces the number of steps involved in preparing a reconstituted drug.

The device described herein provides a solution by multiple steps saving significant time in the doctor’s office.

The device described has a design that is safe to use as it reduces needle handling thus minimizing the potential for needle stick injuries.

The device described herein eliminates dilution errors and subjectivity in the reconstitution process allowing the physician assistants and nurses to reconstitute, saving valuable time for the doctors.

The device described herein is a system that can be useful for any drug product that requires reconstitution.

Traditionally, a pharmaceutical preparation has been dispensed using devices such as syringes. The syringe is usually filled manually by aspirating a liquid pharmaceutical component from a pharmaceutical vial having a neck with a penetrable closure into the syringe through a needle that penetrates the penetrable closure. The method of manually filling the syringe typically includes the steps of drawing air into the body of the syringe until the volume of air in the body approximately equals the volume of pharmaceutical component to be loaded into the syringe and subsequently inserting the needle through the penetrable closure into the vial.

Many pharmaceutical preparations must be distributed and stored as two or more separate components—a typical example would be a lyophilized component and a liquid component such as a diluent. The two components are mixed just prior to administration.

Some medical treatments require the administration of a pharmaceutical composition wherein one of the components of the pharmaceutical composition can be considered to be dangerous due to toxicity or other factors. In other words, the toxic component may have to be diluted in order to provide a composition having the desired properties. Naturally, great care must be exercised when using such toxic components and access to the same needs to be limited.

Referring to the drawings in greater detail and by reference characters thereto, there is illustrated a transfer system which is generally designated by reference numeral 10.

Figure 3:
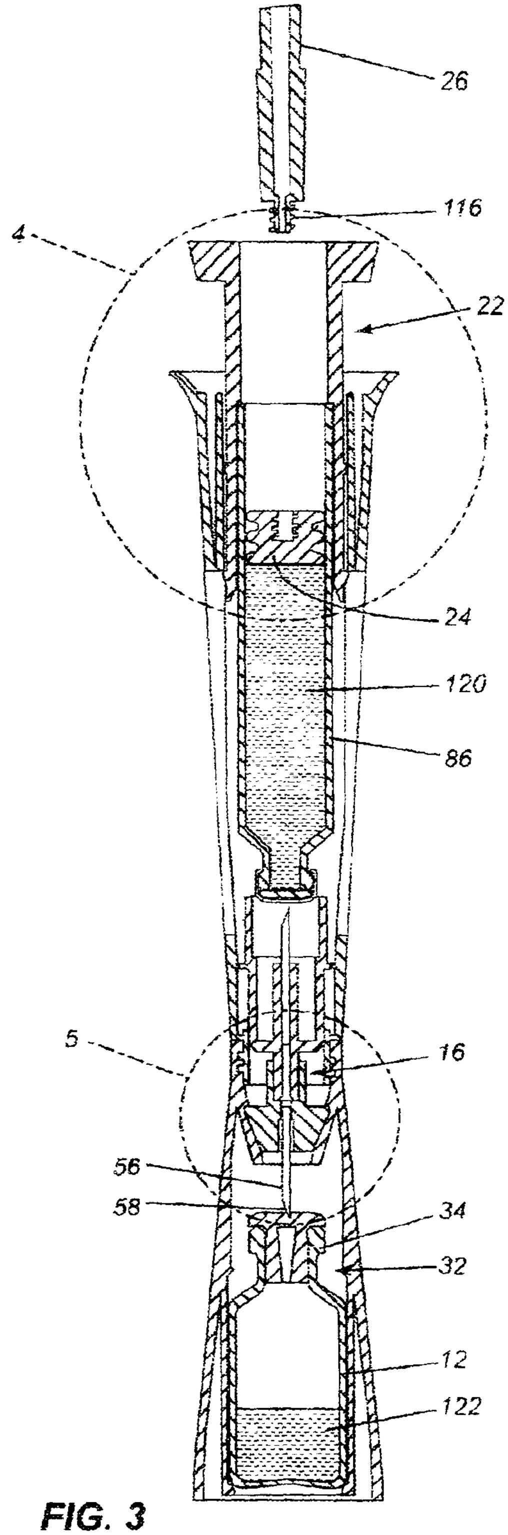
FIG. 3 is a cross-sectional view of a transfer system prior to activation.

A vial generally designated by reference numeral 12 is associated with the transfer system which also includes a vial socket 14 designed to receive vial 12. Transfer system 10 also includes a needle hub generally designated by reference numeral 16 (FIG. 3). A housing 18 is designed to extend about a cartridge 20. The proximal end of transfer system 10 includes an activation cap 22. A plunger 24 is designed to fit within the open end cartridge 20 while a plunger rod 26 is engageable with plunger 24 as will be discussed hereinbelow.

In describing various components, the terms "proximal" and "distal" are utilized. In each instance, the term proximal refers to the end closest to the hand of the user, while the term distal refers to the end furthest removed from the hand of the operator.

Vial 12 may be any conventional vial known to those skilled in the art or alternatively, in certain applications, may be of a non standard size when it is desired to use some specialized components for the vial. Vial 12 will include a body portion 30 having a restricted neck portion 32 over which extends a piercable septum 34.

Vial socket 14 is, in the illustrated embodiment, of a somewhat overall triangular configuration having a plurality of lower outer wall segments 38 each of which is somewhat arcuate in configuration and tapers inwardly from a distal end to meet upper wall segments 44. Lower wall segments 38 define the lower body and there are provided a plurality of inner legs 40 each having inwardly extending flanges for gripping vial 12 at their distal end and being spaced from the wall by means of ribs 42 which extend between inner legs 40 and lower outer wall segments 38.

Figure 2:
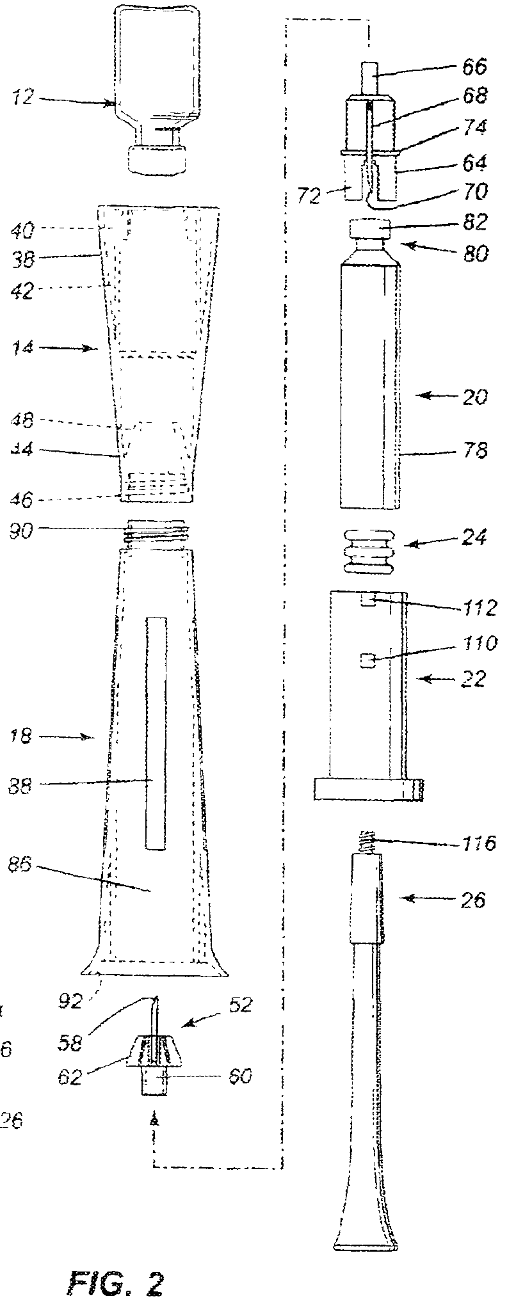
FIG. 2 is an enlarged exploded view of the transfer system of FIG. 1 with dash lines showing the internal structure of certain components.

Vial socket 14 also includes upper wall segments 44 which define, at a proximal end thereof, a female thread opening 46. A plurality of flanges 48 extend downwardly as may be seen in FIG. 2.

Needle hub 16 comprises a distal member 52 and a proximal member 54 which are designed to fit together. Distal member 52 includes a piercing member 56 having a piercing tip 58. At its proximal end, distal member 52 has a tubular end 60. A plurality of fins 62 extend circumferentially of distal member 52.

Proximal member 54 includes a body portion 64 having a tubular portion 66 which is designed to engage with tubular end 60 of distal member 52. A piercing member 68 is secured to body portion 64 and has a piercing tip 70.

Proximal member 54 also includes a pair of legs 72 with an annular ring 74 situated proximate the middle of body 64.

Cartridge 20 includes a body 78 which has an open end designed to receive plunger 24. A piercable septum 82 is arranged at the top of body 78 adjacent neck 80. Housing 18, in the illustrated embodiment, includes a plurality of wall segments 86, there being three such wall segments 86 in the illustrated embodiment. In each wall segment 86, there is provided a slot 88 to provide visual access to the interior. Housing 18 also includes a plurality of male threads 90 at the distal end thereof. Housing 18 also has a flared proximal end 92.

Activation cap 22 has a proximal end wall 104 and a side wall 106 with slots 108 formed therein. A first set of protrusions 110 are designed to engage housing 18 when the activation cap has been activated while a second set of protrusions 112 engage housing 18 prior to activation.

Plunger rod 26 is provided with male threads 116 for screwthreadably engaging plunger 24.

In operation, vial 12 and vial socket 14 are supplied as a unit with the vial inserted therein and retained in a non removable manner. Similarly, cartridge 20 is mounted within housing 18 and activation cap 22 inserted in the proximal end of housing 18. Activation cap 18 is held in a non removable position. Housing 18 is screwthreadably engaged with vial socket 14 by means of respective threads 90, 46.

Figure 4:
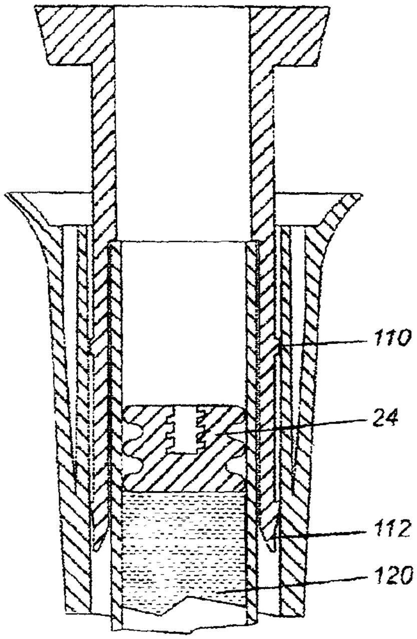
FIG. 4 is an enlarged view of that portion of the transfer system designated by dot dash lines 4.
Figure 5:
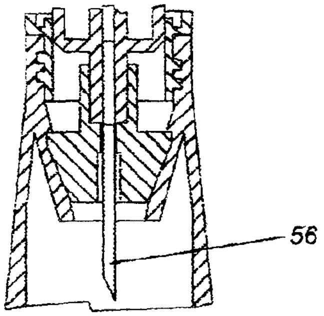
FIG. 5 is an enlarged view of that portion of the transfer system indicated by dot dash lines 5.
Figure 6:
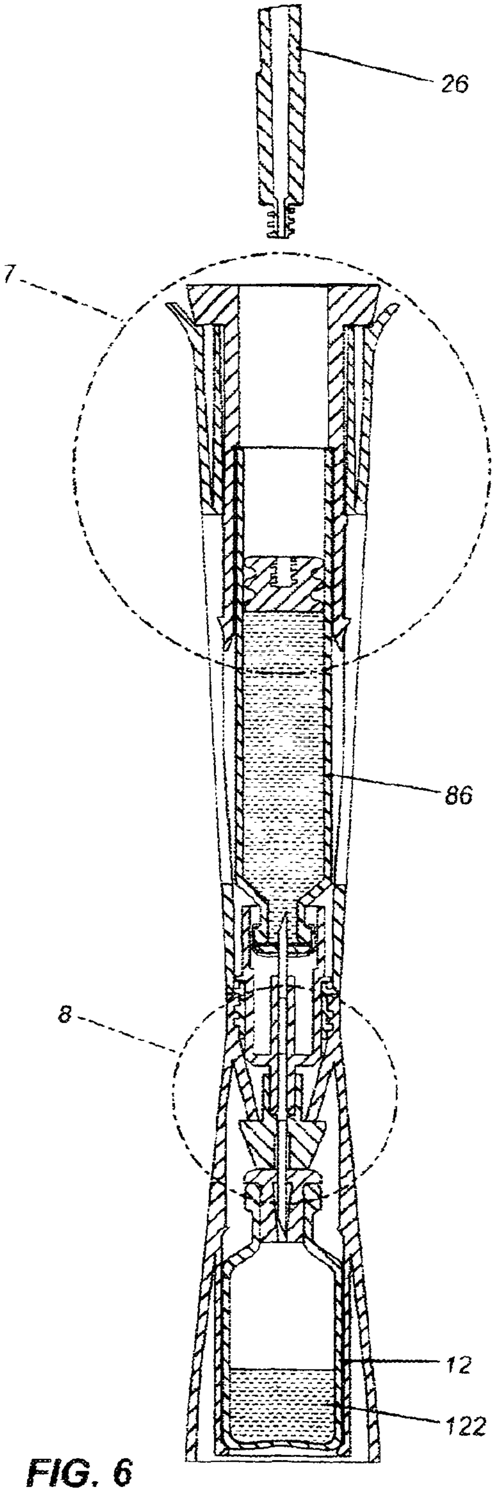
FIG. 6 is a cross-sectional view of the transfer system after activation.
Figure 7:
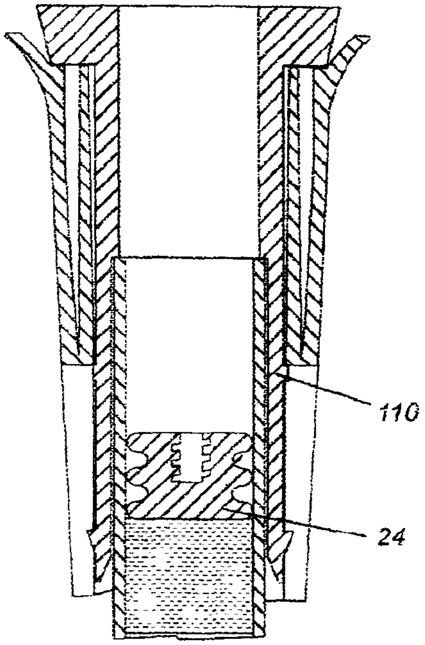
FIG. 7 is an enlarged view of that portion of the transfer system designated by dot dash lines 7.
Figure 8:
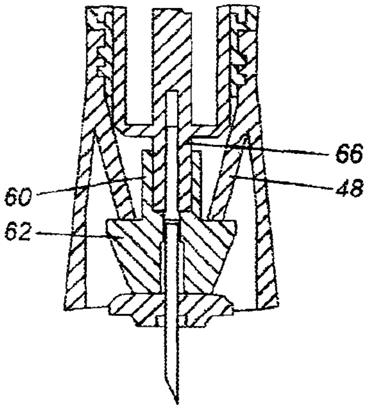
FIG. 8 is an enlarged view of that portion of the transfer system designated by dot dash lines 8.
Figure 9:
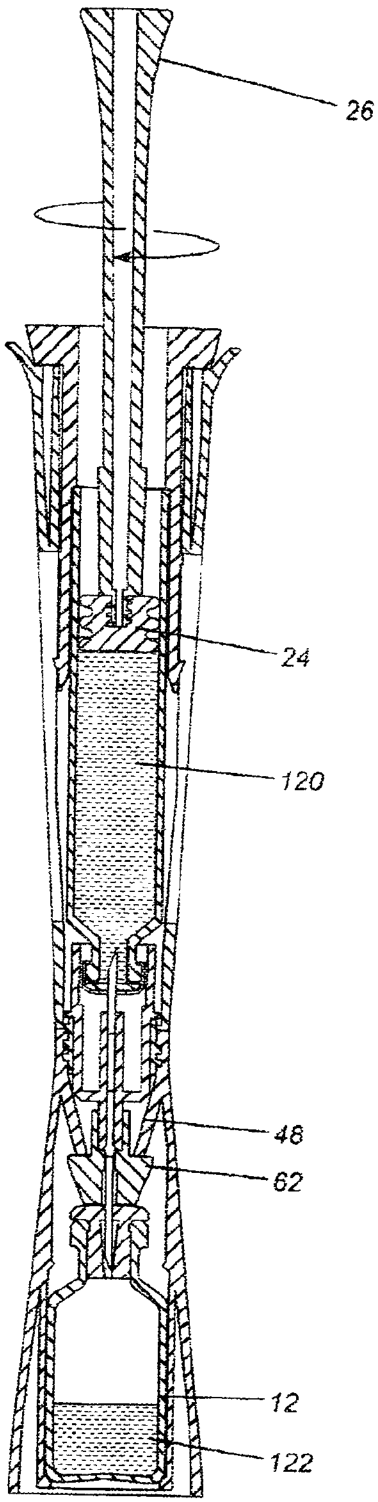
FIG. 9 is a cross-sectional view illustrating attachment of the plunger rod for transfer of one of the components.
Figure 10:
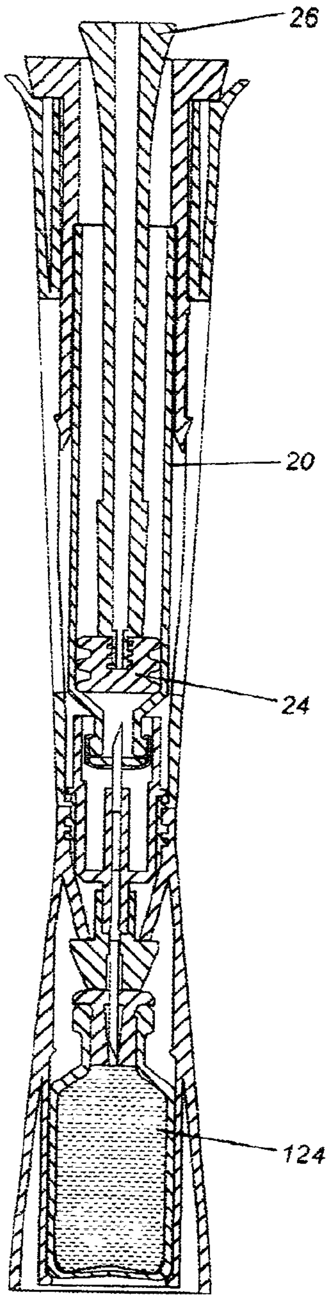
FIG. 10 is a cross-sectional view illustrating transfer of the components.

As illustrated in FIG. 3, activation cap 22 extends exteriorly of housing 18. For use, activation cap 22 is depressed as shown in FIG. 4, thereby leading to a piercing of septum 34 of vial 12 and septum 82 of cartridge 20. Plunger rod 26 is then engaged with plunger 24 by means of their respective screwthreads and pressure is exerted on plunger 24 to transfer the diluent 120 to mix with a component 122 in vial 12. This position is illustrated in FIG. 10.

Figure 11:
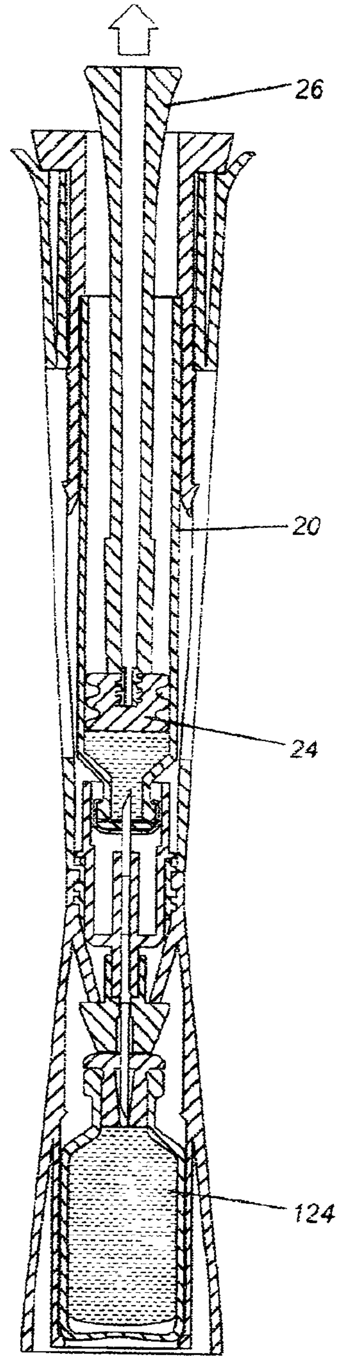
FIG. 11 is a cross-sectional view indicating the beginning of aspiration of the mixture back into the cartridge.
Figure 12:
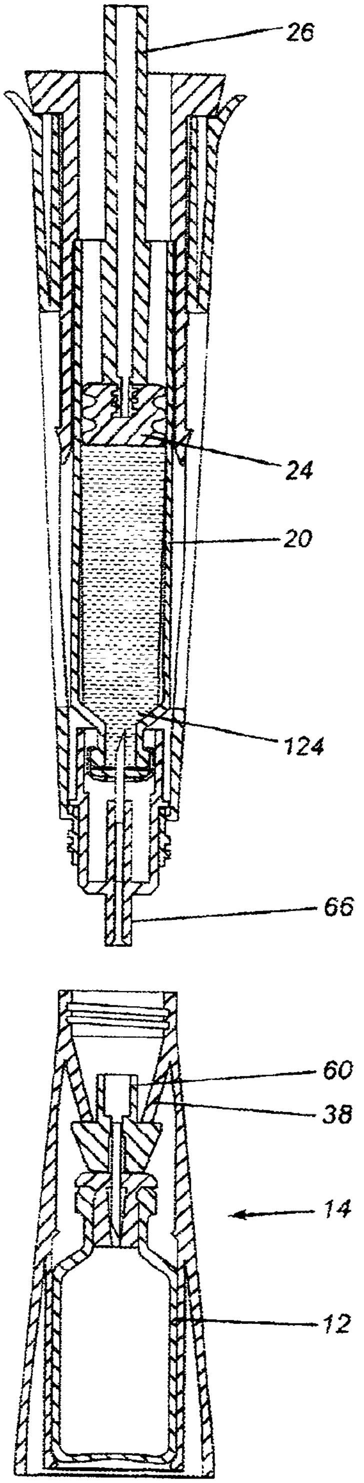
FIG. 12 is a cross-sectional view illustrating separation of the vial socket from the housing holding the cartridge.
Figure 13:
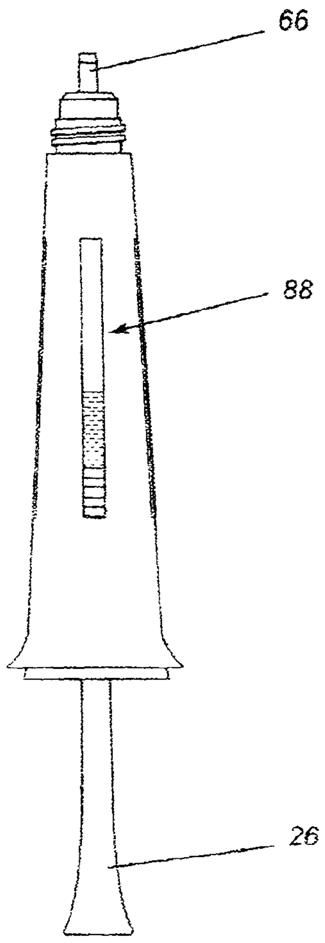
FIG. 13 is a side view illustrating the cartridge ready for application.

At this point in time, a gentle shaking of the vial 12 may occur to ensure mixing of the components, subsequently the mixture 124 is aspirated into cartridge 20 as shown in FIGS. 11 and 12. The housing is then removed from vial socket 14 and the mixture 124 is then dispensed as required. In the illustrated embodiment, tubular portion 66 forms the dispensing member and is specifically designed to apply mixture 124 in a topical manner. To ensure that the mixture is not injected, member 66 would be of a non standard size and/or configuration not designed to accept a needle. However, in certain applications, the attachment of a needle may be desired and appropriate configurations would be provided.

Figure 15:
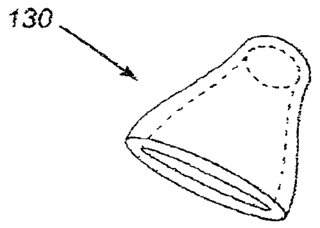
FIGS. 14 and 15 are perspective views showing different applicator tips.
Figure 14:
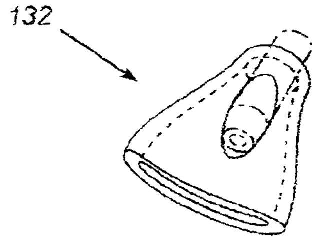
Figure 16:
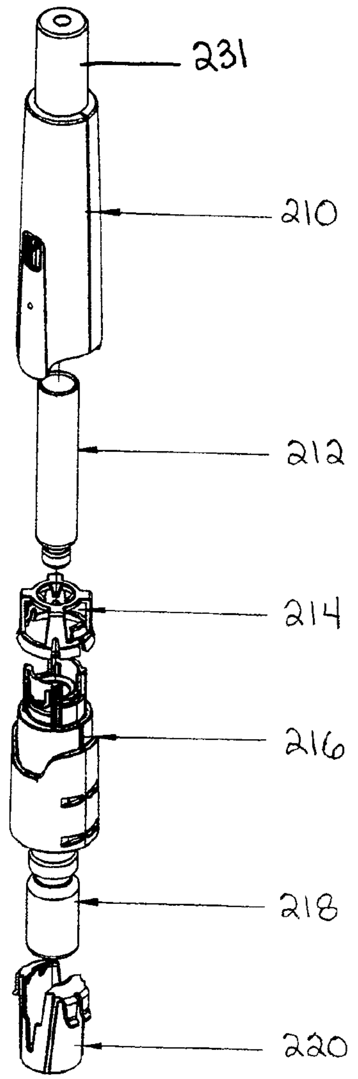
FIG. 16 is an exploded view of a transfer system according to a further embodiment of the present invention.
Figure 17:
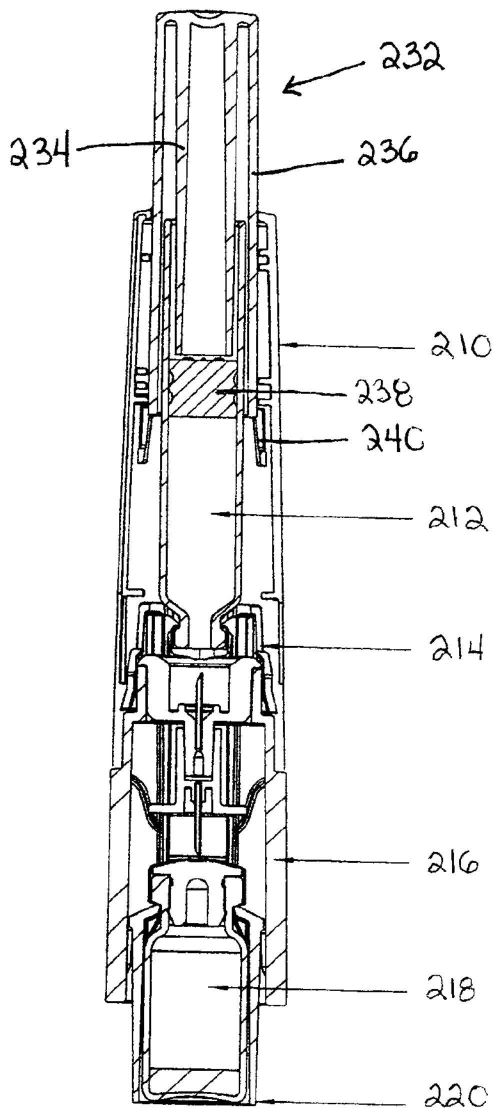
FIG. 17 is a cross-sectional view of the embodiment of FIG. 16 in stand by mode.
Figure 18:
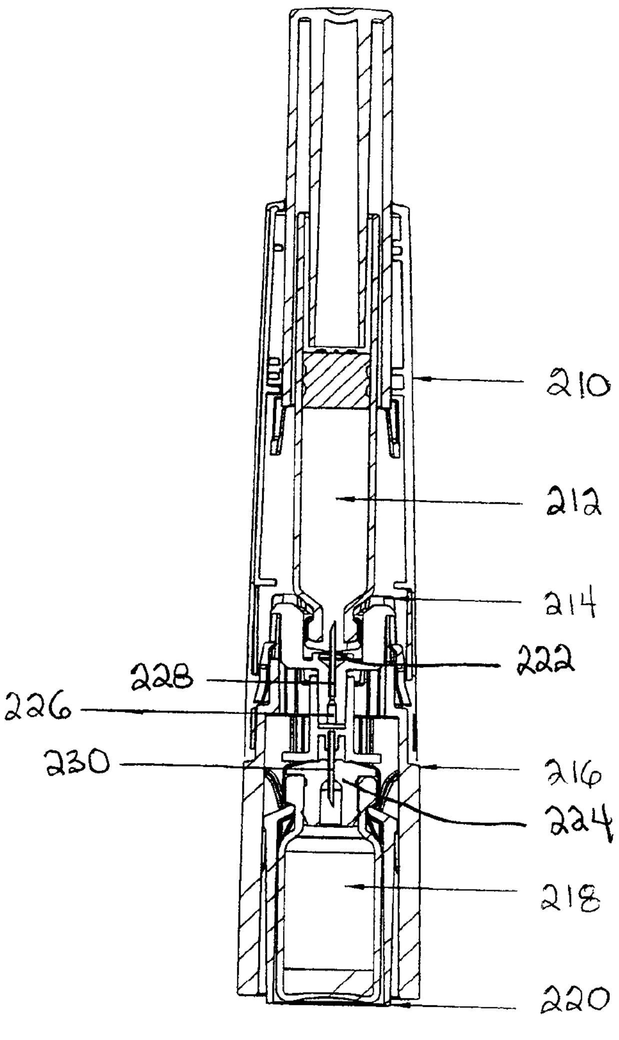
FIG. 18 is a cross-sectional view showing activation of the system.
Figure 19:
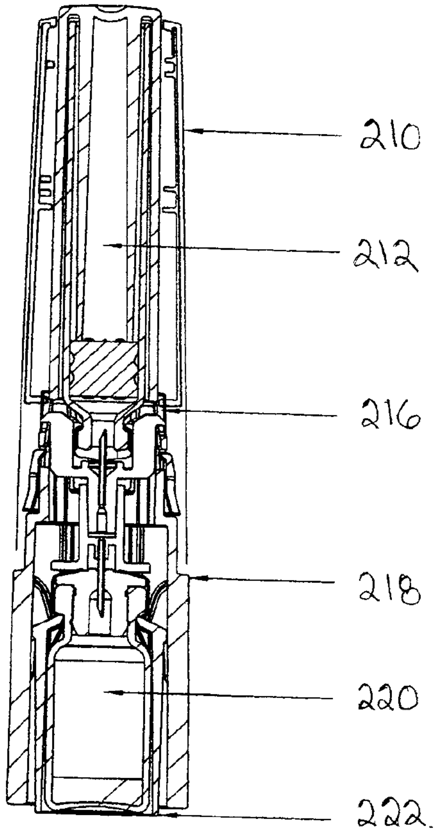
FIG. 19 is a cross-sectional view illustrating the system and reconstitution thereof.
Figure 20:
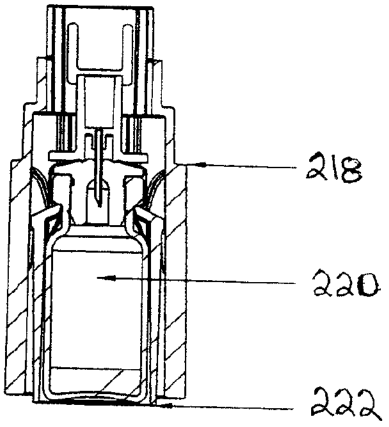
FIG. 20 is a cross-sectional view of the lower portion thereof following activation.
Figure 21:
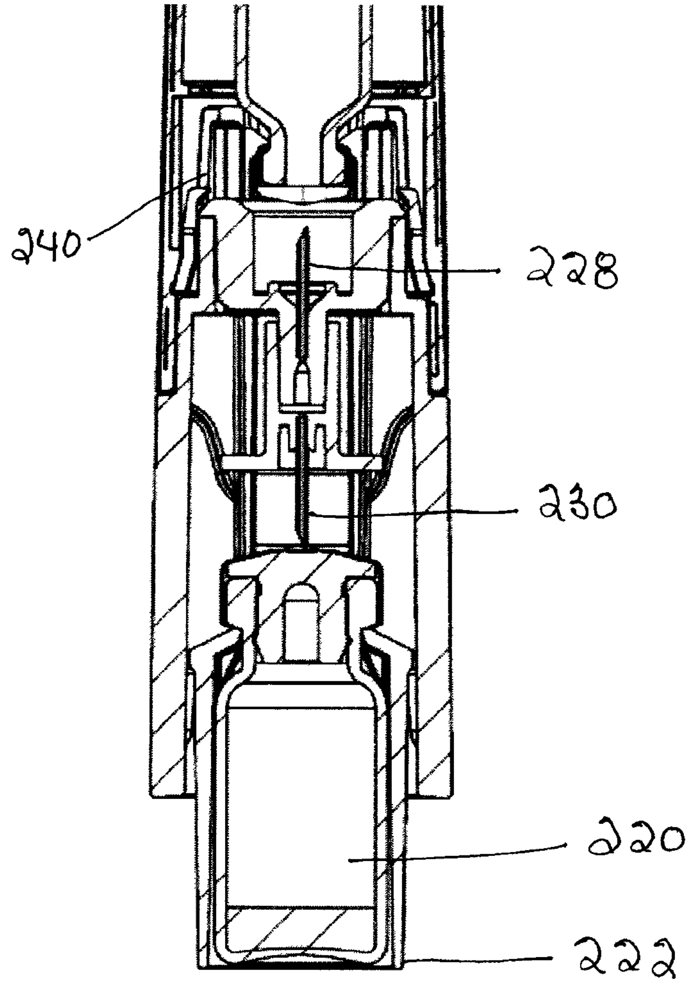
FIG. 21 is a cross-sectional view of a portion of the embodiment of FIG. 16 showing the housing protrusion and vial socket latch

FIGS. 14 and 15 illustrate different dispensing tips 130 and 132 which may be utilized for topical applications.

Based on the hypothesis that if both drug and diluent vial/diluent cartridge are secured and protected from being accessible to the users until after the reconstitution is completed, any potential intentional misuse can be prevented.

The embodiment of FIGS. 16 to 20 illustrates a system having a welded sub-assembly 210, a diluent cartridge 212, a cartridge holder 214, a fluid path sub-assembly 216, a drug vial 218 and a vial holder 220. As is conventional, diluent cartridge 212 has a cartridge septum 222 while drug vial 218 likewise includes a vial septum 224. A cartridge needle hub 226 has a needle 228 designed to pierce cartridge septum 222 and a vial needle hub 229 has a vial needle 230 designed to penetrate vial septum 224.

As may be seen in the drawings, drug vial 218 is secured in the bottom portion of the device which includes the vial holder 220, cartridge needle hub 226, vial needle hub 229 and needles 228 and 230.

Diluent cartridge 212 is secured in the upper portion of the device, which includes cartridge holder 214, sub-assembly 210 and a plunger rod 232. As may be seen, plunger rod 232 has an outer wall 236 and an inner wall 234. Inner wall 234 is designed to engage a cartridge plunger 238 while vial socket latches 240 are locked with protrusions 239 of the housing. Latches 240 are self-locking with cartridge needle hub 226 to prevent removal of cartridge 212.

Similarly, latches 231 are provided with vial socket 220 to engage with housing protrusions 241.

When the user depresses plunger rod 232, the vial will first be pierced followed by the diluent cartridge to avoid leakage or spillage. A fluid path is opened between the two but the device is still locked together.

Upon continuing depression of the plunger rod 232, the latches 240 are collapsed due to outer wall 236 which unlocks the device.

Following transfer, the user can then remove the bottom portion from the top portion of the device and a standard luer connection is now accessible to the user to withdraw the reconstituted drug.

It will be understood that the above described embodiments are for purposes of illustration only and that changes and modifications may be made thereto without departing from the spirit and scope of the invention.

We claim:

1. A reconstitution device comprising:

a cartridge containing a first substance, said cartridge having a plunger at one end and a pierceable septum at a second end;

a vial containing a second substance, said vial having a piercable septum;

a housing;

a cartridge needle hub, said cartridge needle hub having a needle protruding therefrom;

a vial needle hub, said vial needle hub having a needle protruding therefrom;

said vial needle hub and said cartridge needle hub being releasably securable together;

vial socket latches extending to engage said housing; and a plunger rod, said plunger rod having an inner portion engageable with said plunger of said cartridge, said plunger rod having an outer portion which is adapted to engage said vial socket to allow release of said vial needle hub from engagement with said cartridge needle hub, whereby said vial and said vial needle hub are releasable from said housing, wherein depressing the plunger causes the outer portion to engage with the vial socket latches causing it to move inwardly to release the engagement of protrusions of the housing.

2. The reconstitution device of claim 1 wherein said cartridge contains a diluent.

3. The reconstitution device of claim 2 wherein said vial contains a solulable pharmaceutical which is dissolvable in said diluent.

* * * * *